Patented July 24, 1951

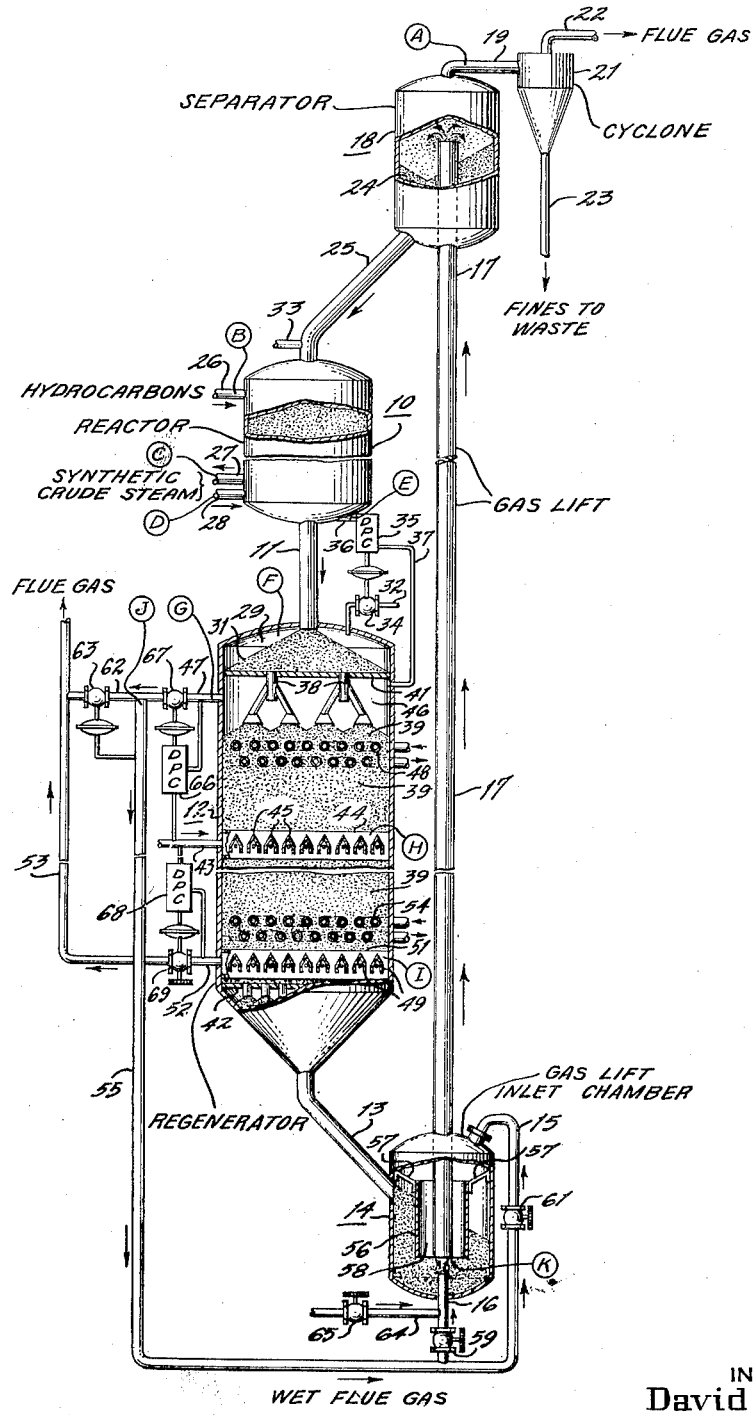

2,561,409

UNITED STATES PATENT OFFICE 2,561,409

PROCESSES EMPLOYING FLUENT SOLIDS

David B. Ardern, Moylan, Pa., assignor to Houdry Process Corporation, Philadelphia, Pa., a corporation of Delaware Application July 25, 1949, Serial No. 106,515

6 Claims. (Cl. 196—52)

This invention relates to continuous hydrocarbon conversion processes, such as cracking, reforming, dehydrogenation, aromatization and the like, of the type in which a refractory solid hydrocarbon conversion catalyst contacts hydrocarbons under conversion conditions and thereby concomitantly accumulates a deposit of coke; the coked catalyst being thereafter contacted with oxygen containing gas under combustion conditions so as to remove at least a portion of said coke and thereby regenerate or reactivate the catalyst for further use, the solid catalyst employed in such processes having been prepared in such a form and handled in such a manner as to be fluent or capable of flowing. When the solid catalyst is in the form of relatively large particles or granules, such as particles ranging in size between 0.5 and 0.05 of an inch, a technique using downwardly moving non-turbulent compact beds of particles has been successful whereas, when the solid catalyst is in the form of relatively small particles such as particles between 100 and 400 mesh, it is handled by techniques known as fluidization and light phase suspension.

The present invention involves the former technique of flowing relatively large particles of granules, such as sized particles, pellets, formed spheres and the like of the size referred to above, downwardly in non-turbulent flow principally or solely by the influence of gravity. The gravitational flow of solids through process zones as compact downwardly moving non-turbulent beds is discussed generally in "The 'T. C. C.' Cracking Process for Motor Gasoline Production" by R. H. Newton, G. S. Dunham and T. P. Simpson, "Transactions of the American Institute of Chemical Engineers," volume 41, page 215, April 25, 1945, and the articles there cited. The fluent particulate solid should preferably be sized so that the particles as a mass are capable of downward flow in compact form due principally or solely to the action of gravity (for example, in a seal leg) while gas is passed countercurrently through the mass, without lifting the particles, at a pressure drop in the range of about 3 to about 8 inches of water per foot of mass depth for the gas involved.

In the compact non-turbulent bed type of system, it has been found advantageous to transport the fluent particulate solid (i. e., catalyst) by one or more gas lifts of the type described herein in order to effect circulation of such particles through a system comprising at least one upflow path and at least one downflow path in which there are one or more reaction or process zones (i. e., a conversion or regeneration zone or both) wherein said solid contacts a reactive or process gas (i. e., hydrocarbons in the conversion zone and oxygen containing gas in the regeneration zone). In a hydrocarbon conversion system of the type described more fully below, the process zones are preferably at different heights in a single downflow path so that the solid particles need be transported by the gas lift only once in a complete cycle of operation although a plurality of gas lifts and of downflow paths may be employed. An exemplary system of this type has been described in an article entitled "Houdriflow: New Design in Catalytic Cracking," appearing, inter alia, in the "Oil and Gas Journal," page 78, January 13, 1949.

In such systems, when the solid particles, after disengagement from the transporting gas, are thereafter moved downwardly in compact non-turbulent flow, the rate of transportation and circulation through the system is easily controlled by controlling the operation of the gas lift. Since the rate of circulation of catalyst will, at constant oil throughput, determine the catalyst to oil ratio and the rate of transfer of heat from the regeneration zone to the conversion zone, it will be easily appreciated that the manner of operation of the gas lift is an important phase of the process as a whole and that it is important to provide an adequate source of lifting gas under substantially constant conditions as economically as possible. This is done advantageously in accordance with the present invention.

As set forth in the article referred to immediately above and in my copending application, Serial No. 29,008, filed May 25, 1948, a hydrocarbon conversion system comprising a gas lift may advantageously employ for the regeneration of the coked catalyst a series of vertically superimposed adjacent regeneration zones.

When such a system is operated by flowing separate streams of oxygen containing gas through the uppermost and the lowermost of said series of regeneration zones, the flue gas discharged from the uppermost regeneration zone is relatively wet due to the preferential combustion of the hydrogen content of the coke deposit while the flue gas discharged from the lowermost zone is relatively dry, as discussed more fully below. In accordance with the present invention, at least a part of the relatively wet flue gas from the uppermost regeneration zone is advantageously employed as at least the major source of the lifting gas used for elevating the catalyst.

In a preferred embodiment of the invention in which two vertically superimposed contiguous regeneration zones are employed, the oxygen containing gas is introduced as a single stream to a level intermediate of the ends of the bed comprising said regeneration zones (i. e., between the uppermost and lowermost regeneration zones) at a pressure at the point of introduction substantially above, such as from about 1 to 6 pounds per square inch, the pressure at the bottom of the lifting zone. The oxygen containing gas thereafter passes as two separate streams through the respective regeneration zones; one stream flowing upwardly through the uppermost zone and another stream flowing downwardly through the lowermost zone, under flow conditions such that the consequent pressure drop through the bed of catalyst in the uppermost zone is less than the difference between the pressure at the point of introduction and the pressure at the bottom of the lifting zone. Since the relatively wet flue gas discharges from the uppermost zone at a pressure at least a small amount above the desired pressure in the lifting zone, it may accordingly be advantageously employed for elevating or lifting the catalyst.

However, within the scope of the invention, the relatively wet flue gas may discharge from the regeneration zone at a pressure lower than that at the bottom of the lifting zone and may, thereafter, be raised in pressure by known means, such as by a compressor, and used as lifting gas. Also, methods of flowing the oxygen containing gas through the uppermost regeneration zone other than that described immediately above (e. g., concurrent flow) may be employed to produce a relatively wet flue gas which is subsequently employed for lifting the catalyst particles, particularly when the pressure of the relatively wet flue gas is raised after leaving the regeneration zone.

When the relatively wet flue gas is, in accordance with the present invention, employed as at least a major portion of the lifting gas, considerable economy may be effected in the cost of compressing and pumping gas ultimately used for lifting or the amount of catalyst circulation may be greater for the same weight quantity and pressure of flue gas. It has been found that, under similar conditions, the weight quantity of gas necessary to lift a given amount of catalyst increases as the molecular weight of the gas is increased, and hence the relatively wet flue gas is more efficient as a lifting medium than the original oxygen containing gas, due to the lowering of the molecular weight of the latter by the presence of steam. An additional saving in pumping costs is effected because the steam in the flue gas is generated in the regeneration zone (by combustion and, in some cases, by desorption) by the expenditure of heat in the regeneration zone. The particular advantages obtained by the use of wet flue gas depends on the interrelation of various parts of the system. When the available supply of flue gas exceeds the requirements of the lift, the same lifting effect, under comparable conditions, can be obtained with wet flue gas at a lower pressure of introduction of the oxygen containing gas to the kiln (i. e., with less compression) than with dry flue gas. Similarly, with a fixed supply of flue gas at the same pressure, more catalyst can be lifted with the wet flue gas than with dry flue gas or the gas lift can be smaller for the same rate of catalyst circulation. For example, typical savings of from 10 to 30 percent are effected in pumping cost when lifting with relatively wet flue gas instead of dry flue gas, under the same conditions of lifting.

The principles involved in the present invention are set forth in detail below in connection with the description of the drawings in which a preferred embodiment of the present invention is shown in a schematic manner. Although the present invention includes within its scope a variety of processes as set forth herein, the drawings will be explained in terms of a catalytic hydrocarbon cracking process, since those skilled in the art will understand thereby how to operate analogous or equivalent processes by the same principles.

The drawing is a schematic representation of the major parts of a system embodying the present invention with parts broken away to reveal the internal construction of several of the vessels.

As illustrated in the drawing, relatively large particules of solid cracking catalyst, such as particles between about 1 to 15 and preferably about 2 to 6 millimeters in diameter, flow downwardly through a converter vessel or reactor, indicated generally at 10, as a downwardly moving non-turbulent bed, and are transferred by conduit 11 to a regenerator vessel or kiln indicated generally at 12 in which the coke deposited on the catalyst particles in the cracking zone is removed. Compositions effective as hydrocarbon conversion and/or cracking catalysts (typically natural or synthetic aluminosolicates) and the conditions in reactor 10 and kiln 12 are well known to the art and need not be repeated here.

Catalyst particles are withdrawn from regenerator 12 and flow downwardly in conduit 13 as a compact non-turbulent column to a gas lift inlet chamber at the bottom of a gas lift, this chamber being indicated generally at 14, and are transported, lifted or elevated vertically upward as a continuous stream of solid particles by a transporting, elevating or lifting gas introduced to the gas lift by conduits 15 and 16, the particles of catalyst passing upwardly through an elongated vertical cylindrical passageway or conduit 17 to a closed housing, vessel or separator indicated generally at 18 which vessel comprises a disengaging zone. The disengaged lifting gas is removed from vessel 18, as from the top thereof by conduit 19. If desirable, the disengaged gases may then pass to a cyclone separator 21, in which entrained fine particles of catalyst are separated from the lift gas. Gas, freed of fine particles, is removed from the top of cyclone separator 21 by conduit 22; the fine particles are removed from the bottom of cyclone separator 21 through conduit 23 and pass to a bin (not shown). Solid catalyst particles disengaged from the transporting or lifting gas settle on the surface of bed 24 in vessel 18, from which bed catalyst particles flow to the reactor through conduit 25 as a relatively compact non-turbulent column of particles. It is to be understood that a particular type of separator, such as vessel 18, is not a part of this invention and that separators other than the one illustrated, which perform the function of separating the lifting gas and the particles of catalyst by various specific methods, may be employed.

Hydrocarbon fractions to be cracked or reformed, ranging from naphthas to heavy residual stocks, are introduced from a feed preparation zone of a type known to the art in vapor, liquid or mixed phase conditions to reactor 10, such as through conduit 26, and contacted by the catalyst particles therein, using known methods and apparatus. The hydrocarbons are passed downwardly through the bed of catalyst in reactor 10 in vapor form and under conversion conditions, disengaged from the catalyst particles, removed from the reactor through conduit 27 and thereafter directed to a fractionation zone for appropriate processing to products such as gasoline, fuel oil, recycle stock and the like. As is apparent to those skilled in the art, hydrocarbons may enter reactor 10 through conduit 27, pass upwardly through the bed of catalyst and be removed by conduit 26, suitable adjustments being made in the pressure relationships described below. A purge gas such as steam, inert flue gas and the like may be introduced to reactor 10 by conduit 28 to purge the catalyst particles of volatile hydrocarbons.

The catalyst, which has accumulated a deposit of coke in reactor 10 concomitantly with the conversion of hydrocarbon vapors, is removed from reactor 10 by conduit 11 (which acts as a seal leg) and discharges into a sealing chamber 29 in the top of kiln 12 so as to form a bed of catalyst 31. In order to prevent mixture of gases in reactor 10 with those in kiln 12, a sealing gas, such as steam, inert flue gas, carbon dioxide or other gases compatible with both the cracking reaction in reactor 10 and the combustion reaction in kiln 12, is introduced to chamber 29 by conduit 32. Similar provision for introducing sealing gas to conduit 25 may be provided, as by conduit 33. The sealing gas in conduit 32 is preferably at a higher pressure than the pressure in either reactor 10 or kiln 12, the flow of the sealing gas introduced to chamber 29 being controlled by a flow control valve 34. Valve 34 may be controlled by a differential pressure controller 35 which is connected by pressure transmitting conduits 36 and 37 to the bottom of reactor 10 and the top of the bed in kiln 12, respectively, the differential pressure controller being adjusted so as to maintain a suitable pressure differential between the pressure in the bottom of reactor 10 and the outlet pressure of the flue gas at the top of the bed in kiln 12. A valve, similarly controlled, may be placed in conduit 33 for maintaining a constant pressure differential between the top of reactor 10 and the pressure in conduit 33. It is to be understood that reactor 10 and kiln 12 may be equipped with various devices used in the art but not shown in the drawing; for example, reactor 10 may contain a device for contacting catalyst particles with liquid oil.

In accordance with the invention, and as shown in the drawing, the regeneration is effected in a series of vertically superimposed adjacent regeneration zones through which the coked catalyst flows successively by introducing in such zones a stream of fresh oxygen containing gas, such as air or air fortified with oxygen. Although any number of such zones may be used, it is preferred to use two of such zones as shown in the drawing. The zones may be separated from each other by any of various means known to the art and may even, within the scope of the invention, be in separate vessels with a seal leg or legs between the vessels. It is, however, preferred to have the zones in a single vessel as shown and to have the catalyst pass therethrough in continuous non-turbulent flow. As will be described more fully below, the flow of gases through the various zones in a desired manner is effected by proper control of the pressure relationship of the various entering and exit gases.

In the embodiment shown in the drawing, the coked catalyst is removed from chamber 29 by means of conduits 38 and thereafter evenly distributed over the horizontal cross sectional area of kiln 12 so as to form a compact bed 39 which moves downwardly through the regeneration chamber (the regeneration chamber or zone being bounded at the top by plate 41 and at the bottom by plate 42). Oxygen containing gas is introduced to the series of regeneration zones at at least one level intermediate to the top and bottom of said series of regeneration zones, as by conduit 43, at a pressure substantially greater than the gaseous pressure at the bottom of the gas lift (i. e., in vessel 14). Gas introduced by conduit 43 enters a manifold or hollow beam 44 and is distributed evenly over the horizontal cross sectional area of bed 39 by channels 45, which are in gaseous communication with manifold 44. Channels 45 are open at the bottom and extend regularly and uniformly over substantially the full extent of the bed in the direction normal to manifold 44. (Gas distributing devices of this character are known to the art; a typical one is described in U. S. Patent 2,468,468, issued on April 26, 1949 to E. L. Sinclair et al.)

A portion of the gas so introduced passes upwardly generally as a stream through the uppermost regeneration zone, contacts the coked catalyst under combustion conditions, disengages from the catalyst particles at the upper surface of bed 39 and passes into disengaging space or chamber 46 at the top of the regeneration chamber from which it is removed as by conduit 47. The depth of the bed of catalyst particles in the uppermost regeneration is selected so that, at desired velocities of oxygen containing gas passing therethrough, the pressure across the bed is not greater than (i. e., is at least slightly less than) the difference between the static pressure in conduit 43 and that at the bottom of conduit 17, this difference being selected or determined by the characteristics of the type of blower or compressor used for compressing the oxygen containing gas and by the conditions of lifting. In accordance with the invention, combustion is effected under such conditions as to produce a relatively wet flue gas (i. e., one generally containing more than about 10 percent and as high as 30 to 40 percent of steam). This effect occurs because the coke deposit contains a substantial amount of hydrogen (typically from 3 to 8 weight percent) which is preferentially burned in the early stage or stages of combustion, as described more fully below, and because the major portion of any water physically adsorbed on the catalyst is desorbed in the initial stage of combustion (the amount of such adsorbed water being as much as 0.5 to 2 weight percent of the catalyst for activated clays). As will be explained more fully below, the steam content of the relatively wet flue gas from the uppermost zone depends upon the relative amount of the total combustion effected in this zone (other conditions of regeneration, such as hydrogen content of the coke, being constant). In order to prevent any unduly high and damaging temperature rise of the catalyst particles due to excess heat of combustion, one or more banks of cooling coils 48, through which heat transfer fluids known to the art, such as water or steam, are circulated, may be placed in the uppermost zone at any appropriate position; for example, as shown in the drawing, where the cooling coils are near the top of the uppermost zone.

The remainder of the oxygen containing gas introduced by conduit 43 passes downwardly through the lowermost regeneration zone generally as a stream separate and apart from the stream in the uppermost zone and contacts the catalyst under conditions such that the remainder of the coke deposited thereon in the reaction zone is burned off (it is to be understood that the system may operate under conditions such that the catalyst leaving kiln 12 consistently has a small amount of residual coke thereon). Under these conditions, a relatively dry flue gas is produced in the lowermost zone. A relatively dry flue gas is considered herein as having less than about 5 percent of water vapor, such as 3 percent or less, including water vapor originally in the fresh oxygen containing gas, such as the atmospheric water vapor in air or water vapor resulting from the combustion of fuel burned in a stream of air to heat the air. (The water vapor content of the relatively wet flue gas similarly includes water vapor originally present in the fresh oxygen containing gas or water vapor resulting from fuel burned to heat such gas.) The relatively dry flue gas is removed from the lowermost regeneration zone by inverted channels 49 and manifold 51, which are similar to channels 45 and manifold 44 respectively, and passes through conduits 52 and 53 to a suitable means of disposal, as, for instance, to a flue gas stack (not shown). Cooling coils 54, which serve to cool the catalyst particles in the same manner as cooling coils 48, may be placed at an appropriate level or levels in the lowermost regeneration zone.

In accordance with the present invention, the relatively wet flue gas is employed as all or a major portion of the gas used in elevating catalyst particles upwardly in conduit 17 by passing all or a portion of the effluent relatively wet flue gas from the uppermost regeneration zone through conduit 55 and thereafter through either or both conduits 15 and 16, as described more fully below.

Although the present invention is not limited to the use of such a device, a desirable device for introducing catalyst particles and lift gas to lift pipe 17 is shown in the drawing. Conduit 13 discharges catalyst particles so that they form a compact bed, generally non-turbulent, in vessel 14, as shown. Positioned within vessel 14 and within the horizontal extent of the compact bed of catalyst particles is a cylinder 56 which cylinder is open at both ends, substantially greater in diameter than lift pipe 17, and spaced and positioned, as by supports 57, with its top above the compact bed of catalyst particles, so that catalyst particles do not enter the annulus 58 formed between cylinder 56 and lift pipe 17, and its bottom completely immersed in the bed of catalyst particles. The bottom of cylinder 56 may be substantially at the same level as the bottom of lift pipe 17 or may be placed slightly higher or lower depending upon the concentration of catalyst particles desired in the stream of catalyst particles and lifting gas in lift pipe 17, or may even be made adjustable instead of fixed as shown in the drawing.

The relatively wet flue gas from the uppermost regeneration zone may be split into two streams and a small portion passed through conduit 16 and a larger portion passed through conduit 15 by adjusting valves 59 and 61, respectively. The portion of gas in conduit 16 moves directly vertically upward into lift pipe 17 while substantially all or most of the gas introduced by conduit 15 passes downwardly through the open annulus 58 between cylinder 56 and lift pipe 17 to the bottom of this annulus and then reverses direction and enters lift pipe 17, sweeping catalyst particles upwardly with it as it enters the lift pipe.

A system such as that illustrated in the drawing affords means for effecting a number of alternative operations, any one of which may be employed depending upon various conditions in the system. For example, the pressure drop relations in the system may be such that the discharge pressure of the relatively wet flue gas from the uppermost of the regeneration zones is appreciably higher, such as from 1.0 to 3.0 pounds per square inch, than that desired at the bottom of gas lift 17 in order to accommodate a pressure drop of from under one to several pounds per square inch through flow and/or pressure control instruments (such as valve 67, whose method of operation is described below) in conduits 47 and/or 55. Alternatively, the discharge pressure of the flue gas may be from several tenths to one pound per square inch greater than the pressure desired at the bottom of the lift and thus provide only for the pressure drop in the piping to the lifting zone. When the amount of relatively wet flue gas exceeds the requirements of the gas lift, excess flue gas may be discharged through conduit 62, the amount so discharged being controlled by valve 63 which is set to produce a desired pressure at the bottom of the gas lift. By this mode of operation, the effect of small variations in the flow of the flue gases on the pressure at the bottom of the gas lift is avoided, since such variations are taken care of by variations in the gas discharged through conduit 62.

In an alternative operation, all of the relatively wet flue gas is passed through conduit 15, valve 59 being closed and valve 61 being completely open and the lifting effected solely by the relatively wet flue gas in conduit 15. If desired, a constant rate of circulation in lift pipe 17 may be established for a selected rate of flow of gas through conduit 47 (thus tending to maintain constant conditions in the uppermost regeneration zone). If an increase in the rate of circulation of the catalyst is desired, additional gas for lifting may be introduced by conduit 64, in an amount adjusted, as by valve 65, so as to produce such desired increase in circulation rate. The amount of such gas introduced is only a relatively minor portion of the total gas utilized for lifting, such as below ten percent, and is preferably of such a nature that the total lifting gas is still relatively wet (i. e., above 10 percent total water vapor content). Suitable gases are steam, wet flue gas and the like.

In the embodiment shown in the drawing, conduit 43 (together with the associated manifold 44 and inverted channels 45) may be positioned at a level between conduit 52 and the top of the bed so as to produce equal or different pressure drops in the separate streams of gas passing through the uppermost and lowermost zones respectively. Generally in the case of unequal pressure drops, it is preferred to have the lesser pressure drop in the uppermost zone since such a disposition of the pressure drops is more effective and economical in that the entering pressure of the oxygen containing gas is lower for the same exit pressure of the gas to be used for lifting (or for the same pressure at the bottom of the gas lift), thereby saving the cost of pumping to a higher pressure.

Moreover, when the lower pressure drop in the uppermost zone is the result of or accompanied by the use of a shallower bed in the uppermost zone than in the lowermost zone, the concentration of steam in the flue gas emerging from the uppermost zone is advantageously high because the relative amount of combustion in the uppermost zone under such conditions represents an earlier stage of the total combustion. Thus, from about 40 to about 65 percent of the hydrogen content of the coke is generally burned in the initial 10 to about 20 percent of the total combustion (the total combustion being based on the total amount of carbon burned) whereas about 10 to 20 percent of the hydrogen content is burned in the portion of the combustion representing about 30 to 50 percent of the total combustion. As those skilled in the art will understand from the above typical data, the steam content of the relatively wet flue gas may be regulated by regulating the percentage of the total combustion that occurs in the uppermost zone. In addition to regulating the depth of the bed, the proportional amount of combustion occurring in the uppermost zone may be regulated or changed by regulating or varying the amount of oxygen containing gas flowing through a given bed depth.

One mode of advantageously operating the preferred embodiment shown in the drawing consists in regulating the flow through the uppermost zone so that a constant amount of gas is passed through said zone (and hence a constant amount of gas is available for lifting) while an amount of oxygen containing gas which varies with the need of the regeneration operation is passed through the lowermost zone. Such a mode of operation may be effected by controlling the pressure drop (or pressure differential) across the uppermost bed at a constant value, as by differential pressure controller 66, which regulates valve 67 so as to produce a constant pressure differential between conduits 43 and 47, while varying the pressure drop across the lowermost zone; as by adjusting differential pressure controller 68 which regulates valve 69 in accordance with the pressure differential between conduits 43 and 52. Since the amount of gas flowing through a given bed depth is substantially proportional to the pressure drop thereacross (where the variation in static pressure is moderate such as from 5 to 10 pounds per square inch gauge), regulation of the pressure drop regulates the amount of gas flowing through such a bed. The amount of gas so passed through the uppermost zone is, of course, limited by the amount that can be passed through the bed without exceeding the velocity at which catalyst particles are lifted from the bed (such velocity is termed the lifting velocity and varies with the physical properties of both the catalyst particles and the gas flowing therethrough). The amount of gas passed through the lowermost zone may vary from no gas flow at zero pressure drop to the maximum pressure drop between the pressure of the entering gas in conduit 43 and the pressure of the flue gas going to the stack (the latter being substantially atmospheric). Moreover the amount of gas passed downwardly through the lowermost zone is not limited by the amount that would exceed the lifting velocity of the catalyst since the flow is downward; the flow of gas in the lowermost zone is limited, if at all, by the disengaging capacity of channels 49. A plurality of levels of such channels suitably equipped, as by orifices, so that less than the total amount of gas enters the channels in any horizontal level, may be used so that the velocity of the downwardly moving stream of gas considerably exceeds the lifting velocity in the bed but not at the disengaging surfaces under channel 49.

If desired, the amount of gas passed upwardly through the upper most zone may exceed the requirements for the gas lift and, in practical operation, it is preferred to have the amount of such gas slightly exceed the requirements for the gas lift so as to provide a margin of safety for minor variations. In the event that the gas in the uppermost zone does exceed the requirements for the gas lift, a substantially considerable pressure at the bottom of the gas lift is maintained by the use of valve 63 which is controlled by the static pressure in conduit 55 leading to the gas lift. When too much gas is passed through conduit 55 a slight rise in pressure will occur therein causing valve 63 to open and spill out, as for example, into a stack, a sufficient amount of gas to reduce the pressure in conduit 55 to the desired constant level.

By the operations described, it is clear that a desirably constant amount of gas is economically furnished to the gas lift at a selected pressure which is desirably maintained constant but which may be varied when the requirements for the gas lift vary. A typical example of the pressures employed in a commercial size plant, in accordance with that illustrated in the drawing (and using countercurrent flow in the reactor) is given in the following table in which pressures at the points indicated in the drawing are given.

| Point in Fig. 1 | A | B | C | D | E | F | G | H | I | J | K |
| --- | --- | --- | --- | --- | --- | --- | --- | --- | --- | --- | --- |
| Static pressure in pounds/sq. in. gauge | 0.3 | 9.0 | 6.0 | 6.2 | 6.3 | 8.2 | 8.0 | 10.0 | 4.0 | 7.0 | 5.0 |

Obviously many modifications and variations of the invention as hereinbefore set forth may be made without departing from the spirit and scope thereof and therefore only such limitations should be imposed as are indicated in the appended claims.

I claim as my invention:

1. In a hydrocarbon conversion system in which solid particulate hydrocarbon conversion catalyst continuously circulates through a system wherein freshly regenerated catalyst contacts hydrocarbons under conversion conditions in a hydrocarbon conversion zone and thereby concomitantly accumulates a deposite of coke; wherein coked catalyst from the conversion zone contacts oxygen containing gas under combustion conditions so as to remove at least a portion of said coke; and wherein catalyst is elevated upwardly in at least one lifting zone by a lifting gas for subsequent flow downwardly through other zones in the system: the improvement which comprises passing said coked catalyst downwardly through a series of vertically superimposed adjacent regeneration zones in compact non-turbulent bed form; introducing oxygen containing gas as separate streams to the uppermost and to the lowermost of said series of regeneration zones; preferentially burning hydrogen in said deposit of coke so as to produce relatively wet flue gas in said uppermost zone; discharging said relatively wet flue gas from said uppermost zone; discharging relatively dry flue gas from said lowermost zone; and elevating catalyst through said lifting zone by relatively wet lifting gas predominantly comprising relatively wet flue gas from said uppermost zone.

2. The improvement of claim 1 in which the relatively wet flue gas from the uppermost regeneration zone contains at least 10 volume percent of water vapor.

3. The improvement of claim 1 in which a minor amount of steam is added to the lifting gas to supplement the relatively wet flue gas.

4. In a hydrocarbon conversion system in which solid particulate hydrocarbon conversion catalyst continuously circulates through a system wherein freshly regenerated catalyst contacts hydrocarbons under conversion conditions in a hydrocarbon conversion zone and thereby concomitantly accumulates a deposit of coke; wherein coked catalyst from the conversion zone contacts oxygen containing gas under combustion conditions so as to remove at least a portion of said coke; and wherein catalyst is elevated upwardly in at least one lifting zone by a lifting gas for subsequent flow downwardly through other zones in the system: the improvement which comprises passing said coked catalyst downwardly through a series of vertically superimposed adjacent regeneration zones in compact non-turbulent bed form; introducing oxygen containing gas as separate streams to the uppermost and to the lowermost of said series of regeneration zones; preferentially burning hydrogen in said deposit of coke by said oxygen containing gas so as to produce relatively wet flue gas in said uppermost zone under gaseous flow conditions such that the gaseous pressure drop through the bed of catalyst in said uppermost zone is less than the difference between the pressure of said oxygen containing gas at the point of introduction and the pressure at the bottom of said lifting zone; discharging said relatively wet flue gas from said uppermost zone; discharging relatively dry flue gas from said lowermost zone; and elevating catalyst through said lifting zone by relatively wet lifting gas predominantly comprising relatively wet flue gas from said uppermost zone.

5. In a hydrocarbon conversion system in which solid particulate hydrocarbon conversion catalyst continuously circulates through a system wherein freshly regenerated catalyst contacts hydrocarbons under conversion conditions in a hydrocarbon conversion zone and thereby concomitantly accumulates a deposit of coke; wherein coked catalyst from the conversion zone contacts oxygen containing gas under combustion conditions so as to remove at least a portion of said coke; and wherein catalyst is elevated upwardly in at least one lifting zone by a lifting gas for subsequent flow downwardly through other zones in the system: the improvement which comprises passing said coked catalyst downwardly through a series of vertically superimposed adjacent regeneration zones in compact non-turbulent bed form; introducing oxygen containing gas as separate streams to the uppermost and to the lowermost of said series of regeneration zones, the pressure of the oxygen containing gas at the point of introduction to said uppermost zone being substantially above the pressure at the bottom of such lifting zone; preferentially burning hydrogen in said deposit of coke so as to produce relatively wet flue gas in said uppermost zone under gaseous flow conditions such that the gaseous pressure drop through the bed of catalyst in said uppermost zone is less than the difference between the pressure of said oxygen containing gas at the point of introduction and the pressure at the bottom of said lifting zone; discharging said relatively wet flue gas from said uppermost zone; discharging relatively dry flue gas from said lowermost zone; and elevating catalyst through said lifting zone by relatively wet flue gas from said uppermost zone.

6. The improvement of claim 5 in which the oxygen containing gas is passed through the lowermost zone under flow conditions such that discharge pressure of the relatively dry flue gas is substantially below the discharge pressure of the relatively wet flue gas.

DAVID B. ARDERN.

REFERENCES CITED

The following references are of record in the file of this patent:

UNITED STATES PATENTS

| Number | Name | Date |
|---|---|---|
| 2,411,996 | Kassel | Dec. 3, 1946 |
| 2,414,373 | Gerhold | Jan. 14, 1947 |
| 2,458,434 | Simpson | Jan. 4, 1949 |
| 2,474,198 | Lee et al. | June 21, 1949 |